Figure 1:
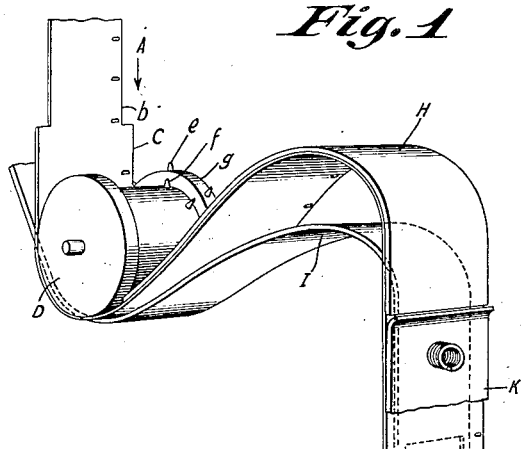

Nov. 6, 1934.  R. P. MAY  1,979,700
AUTOMATIC FILM THREADING MOTION PICTURE MACHINE
Filed March 5, 1931

INVENTOR
RUSSELL P. MAY
BY
ATTORNEY

Patented Nov. 6, 1934

1,979,700

UNITED STATES PATENT OFFICE 1,979,700

AUTOMATIC FILM THREADING MOTION PICTURE MACHINE

Russell P. May, Haddonfield, N. J., assignor to Radio Corporation of America, a corporation of Delaware Application March 5, 1931, Serial No. 520,300

11 Claims. (Cl. 88—18)

The present invention relates to motion picture apparatus such as cameras or projectors, and more particularly to that type of such apparatus in which the film is automatically threaded therethrough.

More particularly, this present invention relates to that type of self-threading motion picture apparatus in which the film is threaded endwise through the mechanism of such apparatus.

The present invention relates most particularly to the formation of the film loop which is necessary in the operation of various motion picture apparatus, due to the intermittent motion of the film through a portion of such apparatus as will be discussed more fully hereinafter.

In motion picture projectors and cameras, it is necessary to move the film intermittently past a picture gate or aperture in which aperture the film is exposed to the influence of the light passing through the lens as in a camera or at which point the projection of the image of the film upon a screen in the case of a motion picture projector takes place. The film, however, in passing from and to the supply and take-up reels respectively must be moved continuously This is necessitated by the considerable mass of the reels and the film accumulated thereon because of which it is impractical to move them in an intermittent manner. Thus, the common practice is to provide continuously rotating sprockets for passing the film from the supply reel and for passing the film to the take-up reel in such motion picture apparatus as is under discussion. The continuously rotating sprockets are thus arranged on each side of the intermittent sprocket or other intermittent film moving devices provided for moving the film in an intermittent manner past the picture gate. It is thus seen that a varying loop of film must be formed between each of these continuously rotating sprockets, and the intermittent device in order to compensate for the differences in the motion of the film past these respective mechanisms. In feeding a film through a motion picture camera or projector, it is therefore necessary that the film be disposed in loops at these points. The adjustment of these loops must be made quite carefully in order that a tension will never exist on the film between the sprockets which would cause the sprocket holes in the edges of the film to tear out. It is also important that the loop be limited in size so that the film will not interfere with or be scratched by the various parts of the camera or projector.

In automatic or self-threading cameras or projectors, it has been customary to pass the film through channels which form it into approximately the shape of the loop desired. After the threading operation is completed, the sides of the channels or guides are released to permit a free variation of the loop size during the operation of the device.

Various other systems have been devised in which the speeds of the various sprockets are retarded or accelerated in accordance with the size of the loop or the tension of the film in order to permit the proper loop size to be maintained at all times as well as in order to permit the original formation of the loops of the proper size.

All of these systems require a considerable number of moving parts and a considerable complication of the structure of the camera or projector results. This complication not only increases the expense of the apparatus but increases the operating difficulties.

It is the object of the present invention to construct a motion picture projector or camera in which the film may be fed through the mechanism automatically.

It is a further object of the present invention to obviate each of the above noted difficulties by providing a projector or camera of the endwise threading type in which the loops required for the operation thereof are formed without the necessity of mechanical motions of any sort.

A further object of this invention is to provide a new and improved system for the self-threading of motion picture film through a camera or projector mechanism.

These and various other objects of my invention will become apparent from the following specification taken in connection with the appended drawing.

In accomplishing the objects of my invention, I provide a leader strip having an increased width and having the sprocket holes thereof disposed at greater intervals than is the case in the usual film. In feeding this portion of the film through the machine, use is made of an auxiliary sprocket, related to each of the regular sprockets, and having teeth disposed at the same angles as the teeth on the regular sprocket but adapted to cooperate with the sprocket holes on the wide portion of the leader strip. The increased spacing of the sprocket holes corresponds to the increase in size of the auxiliary sprocket so that each of these auxiliary sprockets will move the leader strip the same number of sprocket holes that the regular sprocket will move the regular film in a given time but, due to its greater diameter, it will move said leader strip at a greater linear speed. Thus when the film is fed through fixed guides and the leader strip passes the first sprocket, the speed of the film passing over said sprocket is less than the speed of the film passing over the next sprocket, and as a consequence, the loop of film will be shortened so as to leave the guide which formed it, and there is thus formed a loop which is free to vary in each direction the proper amount required for differences in motion of the sprockets.

Figure 3:
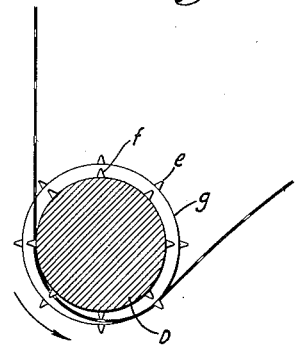
Figure 2:
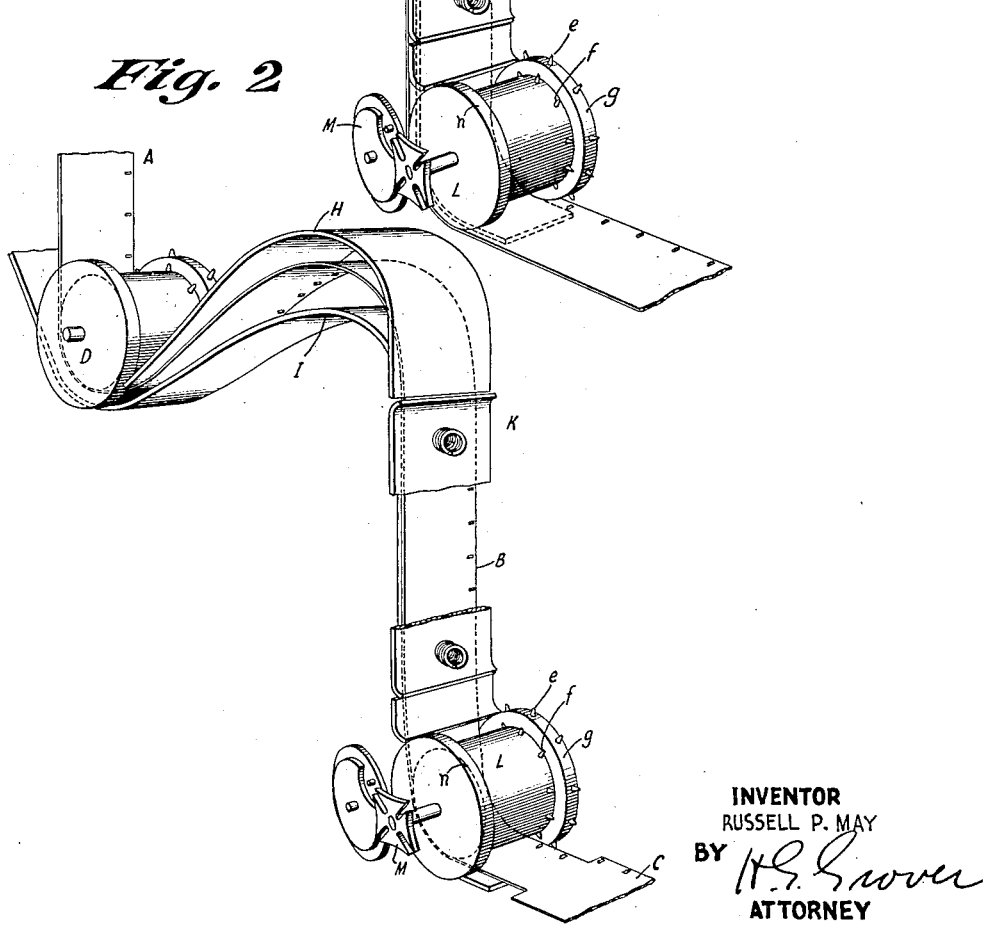

Having thus briefly described my invention, attention is invited to the accompanying drawing in which:

Figs. 1 and 2 are schematic diagrams adapted to illustrate the principles embodying my invention;

Fig. 1 is a diagram showing the leader strip passing through the first loop forming position; and Fig. 2 shows the completed formation of the loop after the leader has passed the first loop forming position; and, Fig. 3 is a cross section of one of the sprockets comprising an element of my invention.

Attention is now invited to the drawing in which like parts are designated by like reference figures.

Figs. 1 and 2 represent the portion of the film path from the take-off sprocket which pulls the film from the loaded film reel down to the picture gate and supplies it to the intermittent sprocket. These figures are adapted to describe the method by which the free loop is formed above the picture gate, but it is to be understood that the method covered is not restricted to this single use and that similar provisions may be made to form the loops in each of the positions required throughout the passage of the film through the machine. As an example, it is desirable to form a loop below the picture gate and it might, in a talking motion picture machine, be desirable to form a loop between a sprocket which is used to move a sound record portion of the film past the sound reproducing apparatus and the hold-back sprocket which supplies the film to the lower take-up reel. Such a loop prevents any irregularities of the film motion, due to the lower reel, being transmitted back through the film to the sound reproducing point and causing thereby a distortion in the sound being reproduced.

The portion of film shown at A represents a standard motion picture film on which the pictures and sound track have been printed ready for projection and reproduction. The arrow indicates the direction of travel of the film, the distance between the sprocket holes of this portion of the film being standard.

It will be noted that at C a leader strip of film wider than the standard film has been provided. This leader strip may be spliced or attached in any way to the regular leader of the film. This wide section of film leader passes through the mechanism initially pulling with it the standard film A. The spacing of the sprocket holes of this wide leader film is greater than standard.

The sprocket D which is more fully illustrated in Fig. 3 carries two sets of teeth e, f. It will be noted that the teeth e protrude from a flange or auxiliary sprocket g which is of larger diameter than the sprocket upon which the teeth f are mounted. The diameters of these sprockets are such that the spacing between the teeth e corresponds to the spacing of the sprocket holes in the wide film C and the spacing between the teeth f corresponds to the spacing of the sprocket holes in the standard film A.

Fixed guide means H, I are provided to guide the film from the sprocket D to the gate K. At the lower end of the gate K are also provided means to guide the film from the lower end of said gate to the intermittent sprocket L constructed similar to the sprocket D and actuated by means of the intermittent motion device generally indicated at M.

These sprockets D and L are so constructed that when the narrow standard film passes over them, the film engages the teeth f mounted on the small diameter sprocket and the flanges at each end produced by the auxiliary sprocket g, and the flange n at the opposite end of the sprockets D and L are so spaced as to just permit the narrow film to pass between them. However, when the wide film is passed around the sprocket, the flanges g and n engage the film, and the teeth e mounted on the auxiliary sprocket g engage the sprocket holes thereof.

Having thus described the elements comprising my invention, I will now describe its operation. The wide leader film C is inserted between the rotating sprocket D and the guide I. The teeth e engage the sprocket holes therein and feed the film between the guides H and I down through the picture gate K to sprocket L where the corresponding set of teeth e engage with the sprocket holes in the film. In its passage through the gate K, the film encounters resistance due to the spring pressure of the gate upon the film and is held back thereby. This causes the film to ride up against the guide H which defines the longest possible path and thus determines the ultimate size of the loop being formed.

It is obvious that an intermittent device of the type shown in my application Serial No. 520,299, filed March 5, 1931, may be used in which an intermittent fork is provided, the throw of the auxiliary fork corresponding to the linear speed of the teeth e on the auxiliary sprocket g and the spacing of the fingers of said intermittent being increased to correspond to the sprocket hole spacing of the leader strip.

Referring to Fig. 3, the transition from the wide film to the narrow film is illustrated. In this figure the film leaving the sprocket is the wide leader film C and the film entering the sprocket is the regular standard film A. It will be noted that the narrow film sinks down to the small sprocket and engages with the teeth thereof. As the film is threaded past the sprocket D to the sprocket L, it is to be understood that the number of sprocket holes in the film therebetween is fixed by virtue of the fact that the narrow film engages with the teeth f without any slipping.

Fig. 2 shows that the narrow film will assume a position midway between the guides H and I, which is due to effectually shortening the film between the sprockets D and L. As stated, the number of sprocket holes between these two sprockets is fixed once the film is threaded through, but the spacing of the sprocket holes in the narrow part of the film being less than the spacing in the wide film and the number of spaces of each of these films between the two sprockets being maintained, the total length of the film A between said sprockets is less than the total length of film originally therebetween and the film is thereby withdrawn from the guide H as shown in Fig. 2 and is therefore permitted to function as a normal loop according to the requirements set forth above.

It is to be understood that these operations can be repeated at the different locations in the projector in the same manner as the loop forming feature is repeated in my co-pending application, Serial No. 520,299, filed March 5, 1931.

It is also to be understood that the usual projecting equipment such as lenses, light sources, shutters, etc. are provided but these are not illustrated here as they constitute no part of the present invention. Further, whereas I have illustrated a film with a single row of sprocket holes, it is obvious that standard film having double sprocket holes and a corresponding machine in which the sprockets have teeth at both ends may be used. In either this latter case or the form shown or described, it is obvious that the leader strip may have either single or double rows of sprocket holes.

Having thus described my invention, attention is invited to the fact that I have merely shown and described one modification thereof for the purpose of illustration, and that I am not to be limited to this specific embodiment but to the scope of my invention as set forth in the appended claims.

I claim:

1. In combination, a motion picture apparatus comprising a plurality of sets of sprockets each comprising film-driving sprockets, additional sprocket means cooperating therewith and adapted to feed a film of greater width than that fed by the film driving sprockets, film conducting guides between said sets of sprockets, a film adapted to be fed through said apparatus by said sprockets with a free loop of film between two of said sets of sprockets, a leader strip attached to said film of greater width than said film and having the sprocket holes thereof spaced longitudinally at a greater distance than in said film, and so cooperating with said additional sprockets that it will be guided from sprocket to sprocket by said guides and in contact therewith.

2. In combination, a motion picture apparatus comprising a plurality of sprockets having an enlarged portion adapted to cooperate with film of greater width than that with which the apparatus is intended to operate, fixed film conducting guides therebetween, a film adapted to be fed through said apparatus by said sprockets with a loop of film between two of said sprockets, a leader strip wider than said film attached to said film, and so cooperating with said sprockets that when threaded through said machine longitudinally, it will ride on the enlarged part thereof.

3. In combination, a motion picture apparatus comprising a plurality of sprockets each having a film feeding portion and having an enlarged portion, fixed film conducting guides therebetween, a film adapted to be fed through said apparatus by said sprockets, a free loop of film between two of said sprockets, and co-operating with the film feeding portion of said sprockets, and a leader strip attached to said film and wider than said film, and cooperating with said enlarged portions of said sprockets.

4. In a device of the type described, the combination of a film to be threaded through a motion picture projector, a special leader strip therefor, having a greater width than the standard film, guide means for guiding the leader strip through the projector, and means for feeding the leader strip at a greater rate of speed than the standard film.

5. In a device of the type described, in combination, a moving picture film to be threaded through a motion picture projector, a leader strip therefor having a greater width than the standard film, guide means for cooperation with said leader strip to form it into a loop as it passes said guide means, means for moving the wide leader strip longitudinally from the guide at such a speed when the standard film is fed into said guide as to withdraw the loop from the guiding means.

6. In a device of the type described, the combination of a film to be threaded through a motion picture projector, and a leader strip for said film having a greater width than said film and having the sprocket holes thereof longitudinally spaced at a greater distance than those of said film.

7. In a device of the type described, a film to be threaded through a motion picture projector, a leader strip for said film, said leader strip being wider than said film, and having the sprocket holes spaced longitudinally at a greater distance than on said film, means within said projector for guiding the film in a predetermined curve, auxiliary sprocket means for pulling said leader strip through said machine, sprocket means for pulling the film through said machine, each of said sprocket means being adapted to pass the leader strip and film at the same number of sprocket holes at a given unit of time, whereby when the leader is upon the second of the two sprockets and the film is upon the first of the two sprockets, the differential of the speed of the film passing said sprockets will cause the film to be drawn from said guide means, thus forming a free loop.

8. A motion picture apparatus of the self-threading type which comprises a series of rotatable sprockets, a series of fixed guides, and means in the form of a leader strip having a greater width than the standard film attached to the film to be threaded through said apparatus, auxiliary sprockets related to each of said rotatable sprockets and having a greater peripheral speed than said rotatable sprockets and adapted to pass the wide leader strip at a greater linear speed than the standard film threaded by said rotatable sprockets.

9. A motion picture apparatus which comprises a plurality of film moving sprockets, a plurality of auxiliary film moving sprockets concentric therewith, and arranged at the sides thereof, and a series of film conducting guides disposed between said auxiliary sprockets to guide the film being threaded from auxiliary sprocket to auxiliary sprocket, the ratio of the diameters of said auxiliary sprockets and said first sprockets being as the ratio of the lengths of film normally conducted through said guides and that normally operated within said guide, in combination with a film adapted to cooperate with the film-moving sprockets and having a leader strip adapted to cooperate with the auxiliary sprockets, whereby the film and the leader strip will be moved through the apparatus at different rates of speed.

10. In a motion picture apparatus, a film moving sprocket and an auxiliary film moving sprocket concentric therewith, said first mentioned sprocket being adapted to move a standard film, and said second mentioned sprocket being adapted to move a wide film through said apparatus, at a predetermined speed having the same ratio to the speed of the standard film as the ratios of diameters of said sprockets, in combination with a film adapted to cooperate with the film-moving sprockets and having a leader strip adapted to cooperate with the auxiliary sprockets, whereby the film and the leader strip will be moved through the apparatus at different rates of speed.

11. In a device of the type described the combination of film guide means, means for feeding a leader strip longitudinally therethrough at a predetermined speed for causing it to traverse the length of the guide, means for feeding film into the guide at a slower speed while the said leader strip is being fed from said guide at said first speed for causing withdrawal of the film from contact with the guide and means for thereafter feeding the film from said guide at the second said speed.

RUSSELL P. MAY.